United States Patent [19]

Schoennagel

[11] 4,288,348

[45] Sep. 8, 1981

[54] SEPARATELY SUPPORTED POLYMETALLIC REFORMING CATALYST

[75] Inventor: Hans J. Schoennagel, Lawrenceville, N.J.

[73] Assignee: Mobil Oil Corporation, New York, N.Y.

[21] Appl. No.: 120,956

[22] Filed: Feb. 13, 1980

Related U.S. Application Data

[63] Continuation-in-part of Ser. No. 112,756, Jan. 17, 1980, and Ser. No. 76,047, Sep. 17, 1979, which is a continuation-in-part of Ser. No. 934,143, Aug. 16, 1978, abandoned, said Ser. No. 112,756, is a continuation of Ser. No. 934,143, , abandoned.

[51] Int. Cl.$^3$ .................... B01J 27/08; B01J 27/10; B01J 23/64; B01J 21/04
[52] U.S. Cl. .................................... 252/441; 252/442; 252/466 PT; 208/138; 208/139
[58] Field of Search .................. 252/441, 466 PT, 442

[56] References Cited

U.S. PATENT DOCUMENTS 3,507,780  4/1970  Spurlock et al. ......... 252/446 PT X
3,578,583  5/1971  Buss ......................... 252/466 PT X

FOREIGN PATENT DOCUMENTS 2627822  2/1977  Fed. Rep. of Germany .

*Primary Examiner*—Patrick Garvin
*Attorney, Agent, or Firm*—C. A. Huggett; M. G. Gilman; C. J. Speciale

[57] ABSTRACT

There is provided, in accordance with the present invention, a catalyst composition made up of a mixture of two components, one component comprising a minor proportion of platinum and rhenium on a support and the second component comprising a minor proportion of iridium on a separate support. A process for reforming a charge stock, such as naphtha, utilizing such catalyst is also provided.

11 Claims, 1 Drawing Figure

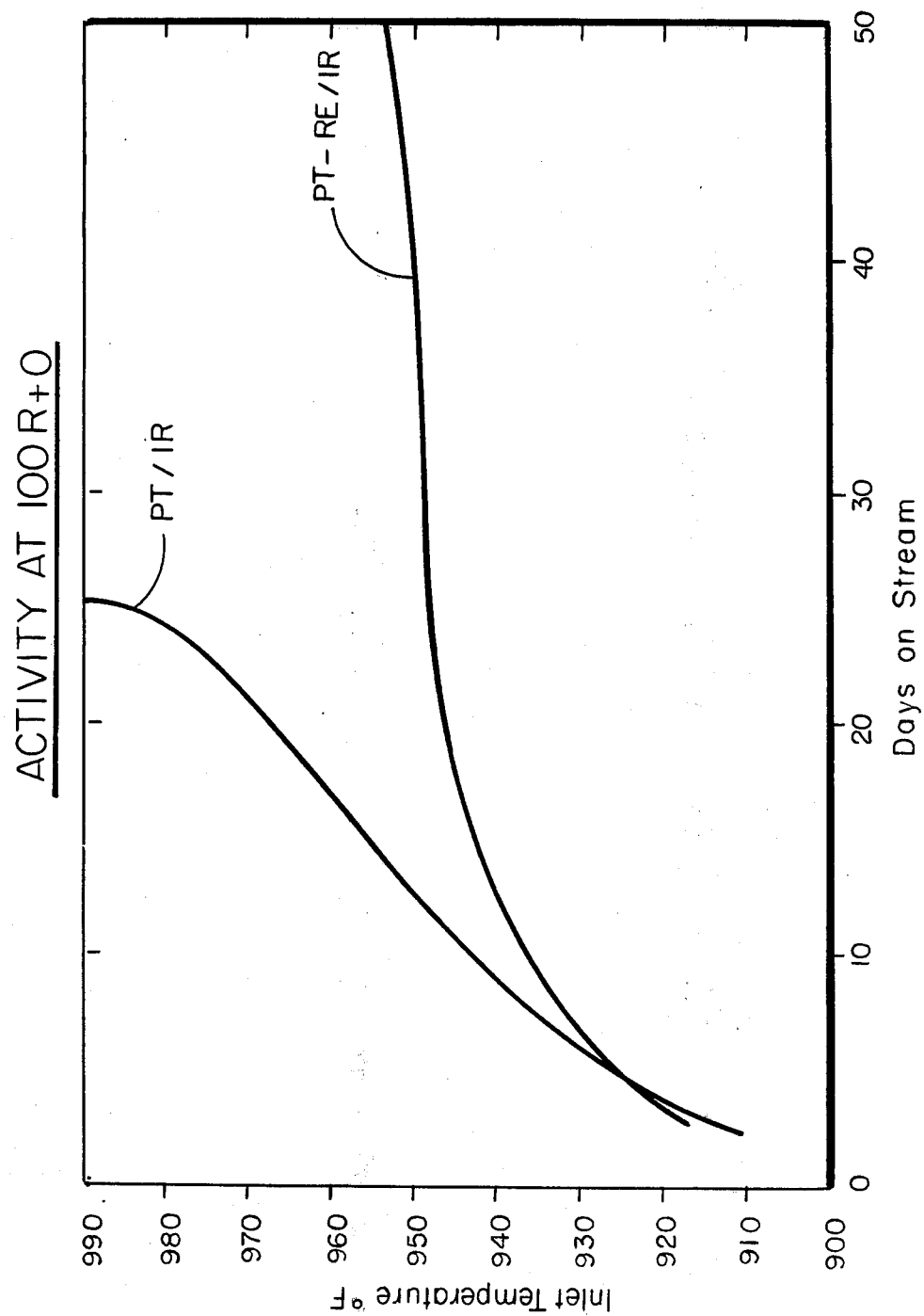

SEPARATELY SUPPORTED POLYMETALLIC REFORMING CATALYST

This application is a continuation-in-part of applicaton Ser. No. 76,047, filed Sept. 17, 1979, and application Ser. No. 112,756, filed Jan. 17, 1980 application Ser. No. 76,047 in turn being a continuation-in-part of application Ser. No. 934,143, filed Aug. 16, 1978 and now abandoned, and application Ser. No. 112,756, filed Jan. 17, 1980 in turn being a continuation of application Ser. No. 934,143, filed Aug. 16, 1978 and now abandoned.

BACKGROUND OF THE INVENTION

1. Field of the Invention

This invention relates to a catalyst composition containing platinum, rhenium and iridium, where (1) platinum and rhenium and (2) iridium are contained on separate particles of a refractory support and to the reforming of selected petroleum fractions in the presence of this catalyst to obtain gasoline of high octane number.

2. Description of the Prior Art

Catalysts intended for use in reforming operations wherein hydrocarbon fractions such as naphthas or gasolines or mixtures thereof are treated to improve the anti-knock characteristics thereof are well known in the petroleum industry.

It has heretofore been proposed to employ platinum metal-containing catalysts for promoting reforming. Such catalysts are necessarily characterized by a certain amount of acidity. One type of reforming catalyst which has been used commercially consists of an alumina base material having platinum metal impregnated thereon, with the acidity characteristic being contributed by a small amount of halogen incorporated in the catalyst.

In more recent years, multimetallic reforming catalysts, for example bimetallic catalysts, have come into use. These catalysts generally contain platinum, together with one or more additional metals such as rhenium, germanium, iridium, palladium, osmium, ruthenium, rhodium, copper, silver, tin or gold deposited on a refractory support which also contains a specified amount of halogen. Representative of multi-metallic reforming catalysts are those containing platinum and iridium, such as described in U.S. Pat. No. 2,848,377 and more recently in U.S. Pat. No. 3,953,368. The latter patent reports certain advantages when platinum and iridium are present on a refractory support as highly dispersed polymetallic clusters in which metallic atoms are separated by distance of about 2.5 to 4.0 Angstroms.

It has also heretofore been known to conduct catalytic reforming utilizing a catalyst consisting essentially of a particularly defined mixture of particles of a porous carrier impregnated with a small amount of platinum and particles of an acidic cracking component. Representative disclosures of such prior art are to be fund in U.S. Pat. Nos. 2,854,400; 2,854,403 and 2,854,404. Also, it has been suggested, for example, in German O.S. No. 2,627,822 to conduct reforming in the presence of a catalyst constituting a mixture of platinum on one solid carrier and rhenium on a second solid carrier.

All of the above catalysts, while possessing certain advantages, suffer from inherent deficiencies in either activity, stability or sensitivity to poisons, e.g., sulfur, under severe reforming conditions. The ability of a reforming catalyst to provide a high yield of gasoline of high octane number over an extended period of time is, as will be realized, a highly desirable attribute, which has long been sought but not fully attained prior to the advent of the present invention.

SUMMARY OF THE INVENTION

In accordance with the invention described herein, reforming of a hydrocarbon charge, such as a naphtha, can be effectively carried out over an extended period of time under conditions of high severity to produce a high yield of gasoline of high octane number when the reforming is conducted in the presence of a catalyst comprising a mixture of (1) a minor proportion of platinum and rhenium on a support and (2) a minor proportion of iridium on a separate support. More particularly, the catalyst comprises a refractory support, about 0.1 to about 5 weight percent of platinum, about 0.1 to about 5 weight percent of rhenium, about 0.1 to about 5 weight percent of iridium and about 0.1 to about 5 weight percent of halogen, with the platinum and rhenium being deposited on one support and iridium being deposited on a separate support.

The relative weight ratio of the separate particles containing platinum-rhenium and those containing iridium is generally between about 10:1 and about 1:10. The dimensions of the separate particles may range from powder size, e.g., 0.01 micron up to particles of substantial size, e.g., 10,000 microns. Preferably, the particle size is between about 1 and about 3000 microns.

The refractory support is contemplated as being an inorganic oxide and usually alumina, of the gamma or eta variety. The halogen component of the catalyst may be present on both the particles containing platinum-rhenium and those containing iridium. Halogen may be chlorine, bromine or fluorine, with particular preference being accorded chlorine. Thus, preferred embodiments of the invention include catalysts comprising separate particles of alumina base, containing a minor amount of chlorine, some of such particles having platinum and rhenium deposited thereon and other of such particles having iridium deposited thereon, with the weight ratio of platinum-rhenium particles to iridium particles being between about 10:1 and about 1:10 and preferably between about 5:1 and 1:5.

Reforming utilizing the described catalysts is conducted in the presence of hydrogen under reforming conditions. The latter include a temperature between about 700° F. and about 1100° F. and more usually between about 800° F. and about 1000° F.; a pressure within the range of about 50 to about 1000 psig and preferably between about 100 and about 700 psig and a liquid hourly space velocity of between about 0.1 and about 10 and preferably between about 0.5 and about 4. The molar ratio of hydrogen to hydrocarbon charge is generally between about 0.5 and about 20 and preferably between about 2 and about 12.

BRIEF DESCRIPTION OF THE DRAWING

The single FIGURE of the drawing shows the reforming performance of the catalyst of the invention, compared to a catalyst of separately supported particles of platinum and iridium, wherein inlet temperature is plotted against days on stream.

DESCRIPTION OF SPECIFIC EMBODIMENTS

Following the teachings of this invention, it has been found that it is possible to operate under more severe reforming conditions, for example, those which will produce a gasoline having an octane number of 100

R+O, than is capable of achievement with other platinum-iridium, platinum-rhenium or platinum-rhenium-iridium catalysts in which all of the metals are deposited on the same support particle. Such severe reforming conditions include, for example, a pressure of 250 psig, a weight hourly space velocity of 2, a total recycle ratio of 7 and a product of 100 R+O octane number. It is possible with the present process to achieve such high octane gasoline even with difficult charge stocks such as an Arab light $C_6$-360° F. naphtha. Accordingly, the reforming catalysts described herein comprising a refractory support and specified minor amounts of platinum, rhenium, iridium and halogen wherein (1) platinum-rhenium and (2) iridium are deposited on separate particles of the support has proved to be highly effective for reforming naphtha charge stocks to high octane gasoline.

The relative weight ratio of the particles containing platinum-rhenium and those containing iridium should be between about 10:1 and about 1:10. The size of the separate particles may range from powder of about 0.01 micron to particles of about 10000 microns. Preferably, the size of the particles will be within the approximate range of 1 to 3000 microns, with the size of the platinum-rhenium-containing and iridium-containing particles either being of differing size within the above range or of substantially the same size.

Charge stocks undergoing reforming, using the catalyst described herein, are contemplated as those conventionally employed. These include virgin naphtha, cracked naphtha, gasoline, including FCC gasoline, or mixtures thereof boiling within the appoximate range of 70° to 500° F. and, preferably within the range of about 120° to about 450° F. The charge stock is contacted in the vapor phase with the catalyst at a weight hourly space velocity between about 0.1 and about 10 and preferably between 0.5 and about 4. Reaction temperature is within the approximate range of 700° F. to 1100° F. and preferably between about 800° F. and about 1000° F. Hydrogen may be added to the reaction zone at a rate corresponding to a mole ratio of hydrogen to hydrocarbon charge of between about 0.5 and about 20 and preferably between about 100 and about 700 psig. Since the reforming process produces large quantities of hydrogen, at least a portion thereof may be conveniently employed for the introduction of hydrogen with the feed.

The refractory support of the present catalyst is a porous adsorptive material having a surface area exceeding 20 square meters per gram and preferably greater than about 100 square meters per gram. Refractory inorganic oxides are preferred supports, particularly alumina or mixtures thereof with silica. Alumina is particularly preferred and may be used in a large variety of forms including alumina, precipitate or gel, alumina monohydrate, sintered alumina and the like. Various forms of alumina either singly or in combination, such as eta, chi, gamma, theta, delta or alpha alumina may be suitably employed as the alumina support. Preferably, the alumina is gamma alumina and/or eta alumina. The above nomenclature used in the presented specification and claims with reference to alumina phase designation is that generally employed in the United States and described in "The Aluminum Industry: Aluminum and its Production" by Edwards, Frary and Jeffries, published by McGraw-Hill (1930).

The refractory support, desirably alumina, having a particle size of at least about 0.01 micron and generally not exceeding about 10,000 microns is contacted with a source of halogen. Both the particles of platinum-rhenium-containing refractory support and the separate particles of iridium-containing refractory support will contain halogen.

Halogen may be added to the support, preferably alumina, in a form which will readily react therewith in order to obtain the desired results. One feasible method of adding the halogen is in the form of an acid, such as hydrogen fluoride, hydrogen bromide, hydrogen chloride and/or hydrogen iodide. Other suitable sources of halogen include salts, such as ammonium fluoride, ammonium chloride and the like. When such salts are used, the ammonium ions will be removed during subsequent heating of the catalyst. Halogen may also be added as fluorine, chlorine, bromine or iodine or by treatment in gaseous hydrogen halide. The halogen, preferably a chlorine or fluorine moiety, may be incorporated into the catalyst at any suitable stage in the catalyst manufacture. Thus, halogen may be added before, after or during incorporation of the platinum-rhenium and iridium on the separate particles of refractory support. Halogen is conveniently incorporated into the catalyst when impregnating the support with halogen-containing metal compounds, such as chloroplatinic acid or chloroiridic acid. Additional amounts of halogen may be incorporated in the catalyst by contacting it with materials, such as hydrogen fluoride and hydrogen chloride, either prior to or subsequent to the metal impregnation step. Halogen may also be incorporated by contacting the catalyst with a gaseous stream containing the halogen, such as chlorine or hydrogen chloride. One feasible way to halogenate the alumina is by the addition of an alkyl halide, such as tertiary butyl chloride during the reforming operation. The amount of halogen introduced into the support is such that the halogen content of the overall catalyst is between about 0.1 and about 5 weight percent. Such halogen content may be deposited on either the platinum-rhenium-containing or iridium-containing particles, and desirably is present on both particles in an approximate weight ratio range which may extend from 1:10 to 10:1 of the total halogen content. Generally, as a preferred and practical matter, the halogen content of each of the particles making up the catalyst of the invention will be approximately the same.

The platinum and rhenium may be deposited on the support, desirably alumina, in any suitable manner. Generally, it is feasible to mix particles of support with a mixture of a platinum compound and a rhenium compound. Suitable platinum compounds include chloroplatinic acid, platinum tetrachloride, bromoplatinic acid, the ammonium salts of chloroplatinic or bromoplatinic acid. Suitable rhenium compounds include perrhenic acid ($HReO_4$) and ammonium perrhenate ($NH_4ReO_4$).

The iridium metal may be deposited on the support, desirably alumina, by contacting with an appropriate iridium compound such as the ammonium chloride double salt, tribromide, trichloride, tetrachloride or chloroiridic acid. Iridium amine complexes may also suitably be employed.

The impregnated platinum-rhenium particles may then be calcined in air at an elevated temperature generally in the range of 800° to 1000° F. and the impregnated Ir particles calcined in an inert gas that does not contain oxygen, preferably nitrogen at a temperature between about 500° and about 750° F. prior to the introduction of the catalyst into the reforming unit. In addition, the catalyst may be exposed to a hydrogen atmosphere to reduce a substantial portion of the metal components to the elemental state.

While, as above described, it is a preferred embodiment of the invention described herein that the present reforming catalyst consist essentially of a mixture of a minor proportion of platinum-rhenium on a support and a minor proportion of iridium on a separate support, the catalyst may optionally contain in addition to platinum-rhenium and iridium, one or several additional catalytic components such as silver osmium, copper, gold, palladium, rhodium, gallium, germanium, tin or compounds thereof on one support containing platinum-rhenium and one or more such additional catalytic components on a second support, which also contains the iridium. The amounts of the added catalytic components may be in the approximate range of 0.01 to 1 weight percent, preferably between about 0.1 and about 1.0 weight percent. The platinum content, rhenium content, iridium content and halogen content of catalysts is in the same range as set forth hereinabove, with the preferred support being alumina.

A very distinct advantage of the trimetallic reforming catalyst described herein containing separate platinum-rhenium/alumina and iridium/alumina particles is its ability to maintain its catalytic activity under conditions of high severity over an extended period of time. In a typical commercial reforming process, reaction temperature is increased during the course of the run to maintain a constant product octane level. Increasing the reaction temperature becomes necessary since the catalyst is continuously deactivated. Generally, the reaction temperature cannot exceed about 1000° F. before rapid deactivation of the catalyst is encountered. Accordingly, as the reaction temperature approaches about 1000° F., it is usually necessary to regenerate the catalyst. Regeneration is accomplished by burning the coke deposit from the catalyst and then treating with chlorine, HCl-oxygen mixtures or organic chloride-oxygen mixtures to rejuvenate the catalyst and thereby restore its activity and selectivity.

Since the catalyst of the present invention maintains its catalytic activity over an extended period of time, inlet temperatures do not have to be increased as rapidly, thus reducing the frequency of the need for regeneration. For example, the present catalyst containing separate platinum-rhenium on alumina and iridium on alumina particles has maintained a 100 R+O octane level at an inlet temperature of approximately 950° F. for about 50 days and can be used with increasing temperature for an extended period before needing regeneration. By comparison, a catalyst containing separate platinum on alumina and iridium on alumina particles at the same condition will require an inlet temperature in excess of 980° F. at 20 days. The aging rate of the present catalysts as measured by the increase in degrees Fahrenheit of the inlet temperature per day (°F./day) is demonstrated in the Examples.

It is contemplated that the catalyst described hereinabove may be employed in any of the conventional types of processing equipment. Thus, the catalyst may be used in the form of discrete particles or the components, in finely divided form, may be admixed and pelleted, cut, molded, extruded or otherwise formed into pieces of demand size and shape, such as rods, spheres, granules, pellets, extrudates, etc., it being essential that each of said pieces is composed of particles of both components. The catalyst may be dispersed on a fixed bed within a reaction zone. The charge stock may be passed through the catalyst bed as a liquid, vapor or mixed phase in either upward or downward flow. The catalyst may also be used in a form suitable for moving beds. In such instance, the charge stock and catalyst are contacted in a reforming zone wherein the charge stock may be passed in concurrent or countercurrent flow to the catalyst. Alternatively, a suspensiod-type process may be employed in which the catalyst is slurried in the charge stock and the resulting mixture conveyed to the reaction zone. The reforming process is generally carried out in a series of several reactors. Usually, three to five reactors are used. The catalyst of the invention may be employed in just one of the reactors, e.g., the first reactor, or in several reactors, or in all reactors. After reaction, the product from any of the above processes is separated from the catalyst by known techniques and conducted to distillation columns where the various desired components are obtained by fractionation.

In accordance with one embodiment of this invention, it is possible to isolate the platinum-rhenium-containing portion of the catalyst from the iridium-containing portion since the same are located on separate particles. Thus, should a catalyst of the present invention become deactivated due to the loss of activity of either the platinum-rhenium-containing or the iridium-containing portion of the catalyst which is adversely affected rather than the whole catalyst. It is thus possible to provide separate and optimum means for ready regeneration of each of the two components. For example, the catalyst of the present invention after becoming spent, may be separated into platinum-rhenium-containing components and iridium-containing components by providing the respective particles with a different physical characteristic which permits their ready separation, such as a difference in particle size. The particles of differing size may be separated by flotation, air blowing, sifting or by any of the various other known means for separating physically and/or chemically different materials. The separated platinum-rhenium-containing and iridium-containing particles may then be separately regenerated under conditions best suited for each.

The ability to select the amount of platinum-rhenium-containing component and the amount of iridium-containing component making up the ultimate catalyst mixture has the advantage that the amount of platinum and rhenium, as well as the amount of iridium, contained in the catalyst, can be controlled not only by the respective concentrations of the platinum-rhenium and iridium impregnating solutions used but also by the respective amounts of the platinum-rhenium-containing and iridium-containing components of the catalyst. If the trimetallic catalyst of this invention is used in the form of a mixture of particles, the two components of the mixture will be physically independent. Accordingly, a process using catalysts in this form affords substantial flexibility in catalyst composition within the limits noted hereinabove. Thus, in changing type of charge stocks such as between paraffinic and naphthenic stocks, the catalyst composition can be adjusted with respect to activity and/or selectivity for optimum performance in accordance with this invention by adding or withdrawing one or the other of the catalyst components.

It is also within the purview of this invention to select the refractory support most suitable for use with the metal deposited thereon. The separate particles making up the present catalyst afford flexibility in choice of refractory support, such as the type of alumina employed. Thus, in one embodiment it is contemplated that iridium is desirably deposited on the more acidic eta form of alumina with platinum-rhenium being deposited on the gamma form of alumina. Such catalyst would have the advantage of reducing the amount of light hydrocarbons, such as methane and ethane to yield a stream of hydrogen of enhanced purity, suitable for recycle or other use.

The following examples will serve to illustrate the catalyst and process of the present invention without limiting the same:

EXAMPLE 1

A composite of platinum-rhenium on alumina was prepared by presaturating 150 g. of humidified 1/16 in. (0.158 cm) gamma alumina beads with gaseous $CO_2$ and then impregnating with 135 ml. of an aqueous solution of $H_2PtCl_6.6H_2O$ and $HReO_4$ containing an equivalent of 0.9 g. of metallic platinum and 0.9 of metallic rhenium based on the dry weight of the alumina. The impregnated beads were held under a $CO_2$ atmosphere for one hour, dried and then calcined at 900° F. in air to produce beads containing 0.6 weight % platinum and 0.6 weight % rhenium.

A component of iridium on alumina was prepared by presaturating 250 g. of humidified 1/16 in. (0.158 cm.) gamma alumina beads with gaseous $CO_2$ and then impregnating with 225 ml. of an aqueous solution of $H_2IrCl_6H_2O$ containing an equivalent of 1.5 g. of metallic iridium based on the dry weight of the alumina. The impregnated beads were held under a $CO_2$ atmosphere for one hour, dried and then calcined at 700° F. in nitrogen to produce beads containing 0.6 weight percent iridium.

The platinum-rhenium beads were further treated for two hours with a gas containing a mixture of 1.93 volume percent $Cl_2$ in nitrogen at a rate of 1.5 weight percent $Cl_2$ based on the total catalyst composite weight per hour. Equal amounts of the platinum-rhenium component and the iridium component were then combined to produce a catalyst containing 0.3 weight percent platinum, 0.3 weight percent rhenium and 0.3 weight percent iridium which was then treated with hydrogen at a temperature of 850° F., a hydrogen partial pressure of 1 atmosphere for 2 hours before being used in a reforming operation.

EXAMPLE 2

A composite of platinum-rhenium on alumina containing 0.3 weight percent platinum and 0.3 weight percent rhenium and 0.69 weight percent chlorine was prepared according to the procedure of Example 1, using 15 g. of humidified 1/16 in. (0.158 cm.) gamma alumina beads, presaturated with gaseous $CO_2$ and 13.5 ml of aqueous solution of $H_2PtCl_6.6H_2O$ and $HReO_4$ containing an equivalent of 0.045 g. of metallic platinum and 0.045 g. of metallic rhenium. The beads were dried and calcined in air as described in Example 1.

EXAMPLE 3

A composite of iridium on alumina containing 0.375 weight percent iridium and 0.41 weight percent chlorine was prepared according to the procedure of Example 1, using 150 g. of humidified 1/16 in. (0.158 cm.) gamma alumina beads, presaturated with gaseous $CO_2$ and 135 ml. of an aqueous solution of $H_2IrCl_6.6H_2O$ containing an equivalent of 0.56 g. of metallic iridium. The beads were dried and calcined in nitrogen as described in Example 1.

EXAMPLE 4

A composite of iridium on alumina containing 1.2 weight percent iridium and 1.31 weight percent chlorine was prepared according to the procedure of Example 1, using 10 g. of humidified 1/16 in. (0.158 cm.) gamma alumina beads, presaturated with gaseous $CO_2$ and 9 ml. of an aqueous solution of $H_2IrCl_6.6H_2O$ containing an equivalent of 0.12 g. of metallic iridium. The beads were dried and calcined in nitrogen as described in Example 1.

EXAMPLE 5

Equal weight samples of the composite of platinum-rhenium on alumina of Example 1 and the composite of iridium on alumina of Example 3 were combined and thoroughly mixed together. The final composition of the catalyst was 0.3 wt. % platinum, 0.3 wt. % rhenium, 0.19 wt. % iridium and 0.57% chlorine.

EXAMPLE 6

Equal weight samples of the composite of platinum-rhenium on alumina of Example 1 and the composite of iridium on alumina of Example 4 were combined and thoroughly mixed together. The final composition of the catalyst was 0.3 wt. % platinum, 0.3 wt. % rhenium, 0.6 wt. % iridium and 1.02% chlorine.

EXAMPLE 7

Equal weight samples of the composite of platinum-rhenium on alumina of Example 2 and the composite of iridium on alumina of Example 1 were combined and thoroughly mixed together. The final composition of the catalyst was 0.15 wt. % platinum, 0.15 wt. % rhenium, 0.3 wt. % iridium and 0.51% chlorine.

EXAMPLE 8

Equal weight samples of the composite of platinum-rhenium on alumina of Example 2 and the composite of iridium on alumina of Example 3 were combined and thoroughly mixed together. The final composition of the catalyst was 0.15 wt. % platinum, 0.15 wt. % rhenium, 0.19 wt. % iridium and 0.39% chlorine.

EXAMPLE 9

The catalyst of Example 1 was tested for reforming utilizing a charge constituting an Arab light naphtha having the following properties:

| Properties | |
| --- | --- |
| Gravity, °API | 61.5 |
| Specific Gravity | 0.7330 |
| Molecular Weight | 107 |
| Sulfur, ppm | 0.7 |
| Chlorine, ppm | <1 |
| Octane No. RON Clear | 50.5 |
| ASTM Distillation, °F. | |
| IBP | 100 |
| 5% vol | 152 |
| 10% vol | 169 |
| 20% vol | 206 |
| 30% vol | 227 |
| 50% vol | 246 |
| 50% vol | 264 |
| 60% vol | 280 |
| 70% vol | 299 |

| | |
|---|---|
| 80% vol | 320 |
| 90% vol | 344 |
| 95% vol | 355 |
| FBP | 386 |

| Analysis | Vol. Percent |
|---|---|
| Paraffins | 69.6 |
| Naphthenes | 18.2 |
| Aromatics | 12.0 |

Reforming of the above charge was accomplished in an adiabatic three reactor system at an inlet temperature of 940° F., a pressure of 200 psig, using a weight hourly space velocity of 2.5, a recycle mole ratio of hydrogen to charge of 5 and a $H_2O/HCl$ ratio of 10 added during the run to halogenate the alumina to a level of approximately 1.0 weight percent. The chloride level of the catalyst was adjusted by adding 0.2 weight percent of chlorine in the form of tertiary butyl chloride during the first two days of reforming operation.

The results obtained are shown in the attached FIGURE where inlet temperature necessary to obtain a product having an octane number of 100 $C_5+R+O$ is plotted against time on stream.

EXAMPLE 10

A comparison was made under reforming conditions of the catalyst of Example 1 and a catalyst made up of equal parts of 1/16 in. (0.158 cm.) gamma alumina beads containing 0.6 weight percent platinum and separate 1/16 in. (0.158 cm.) gamma alumina beads containing 0.6 weight percent iridium for a total catalyst composition of 0.3 weight percent platinum, 0.3 weight percent iridium and 1.0 weight percent halogen. The charge stock and reforming conditions were same as in Example 9.

The performance of each of these catalysts in a reforming process is demonstrated in the attached FIGURE wherein the inlet temperature is plotted against days on stream. The aging characteristics can be calculated in terms of the degrees Fahrenheit increase in inlet temperature per day (°F./day).

As can be seen from the comparative plotted data, using the catalyst containing platinum and iridium on separate supports, the inlet temperature increases 40% between the 10th and 25th days or 2.7° F./day. With the catalyst containing platimum-rhenium and iridium on separate particles, illustrative of the catalyst of the invention (Example 1), the inlet temperature rises 10° F. between the 5th and 50th day or 0.3° F. day. The platinumiridium catalyst will require regeneration at the end of 25 days whereas the catalyst of Example 1, having only reached an inlet temperature of 955° F. at the end of 50 days, will not require regeneration for some time.

It is to be understood that the above description is merely illustrative of preferred embodiments of the invention, of which many variatons may be made within the scope of the following claims by those skilled in the art without departing from the spirit thereof.

What is claimed is:

1. A catalyst composition made up of a mixture of two components one component comprising a minor proportion of platinum and rhenium on a support and the second component comprising a minor proportion of iridium on a separate support.

2. The catalyst composition of claim 1 wherein said support is an inorganic oxide.

3. The catalyst composition of claim 1 wherein said support is alumina.

4. A catalyst composition comprising a refractory support, about 0.1 to about 5 percent by weight of platinum, about 0.1 to about 5 percent by weight of rhenium, about 0.1 to about 5 weight percent or iridium, about 0.1 to about 5 weight percent of halogen, wherein said platinum and rhenium are contained on particles of one support and iridium is contained on separate particles of said support, with the relative weight ratio of the particles containing platinumrhenium and those containing iridium being between about 10:1 to 1:10.

5. The catalyst composition of claim 4 wherein said refractory support is an inorganic oxide.

6. The catalyst composition of claim 4 wherein said refractory support is alumina.

7. The catalyst composition of claim 4 wherein said halogen is chlorine.

8. The catalyst composition of claim 4 wherein the weight ratio of particles containing platinum-rhenium and those containing iridium is between about 5:1 to 1:5.

9. The catalyst composition of claim 4 wherein the size of said particles is between about 0.01 micron and about 10000 microns.

10. The catalyst composition of claim 4 wherein the size of said particles is between about 1 and about 3000 microns.

11. The catalyst composition of claim 4 wherein platinum-rhenium is deposited on a support of gamma alumina and iridium is deposited on a support of eta aluminas.

* * * * *